VAN WYCK A. CROSHIER.
STREET FEEDING DEVICE FOR HORSES.
APPLICATION FILED JAN. 29, 1908.
924,435.
Patented June 8, 1909.
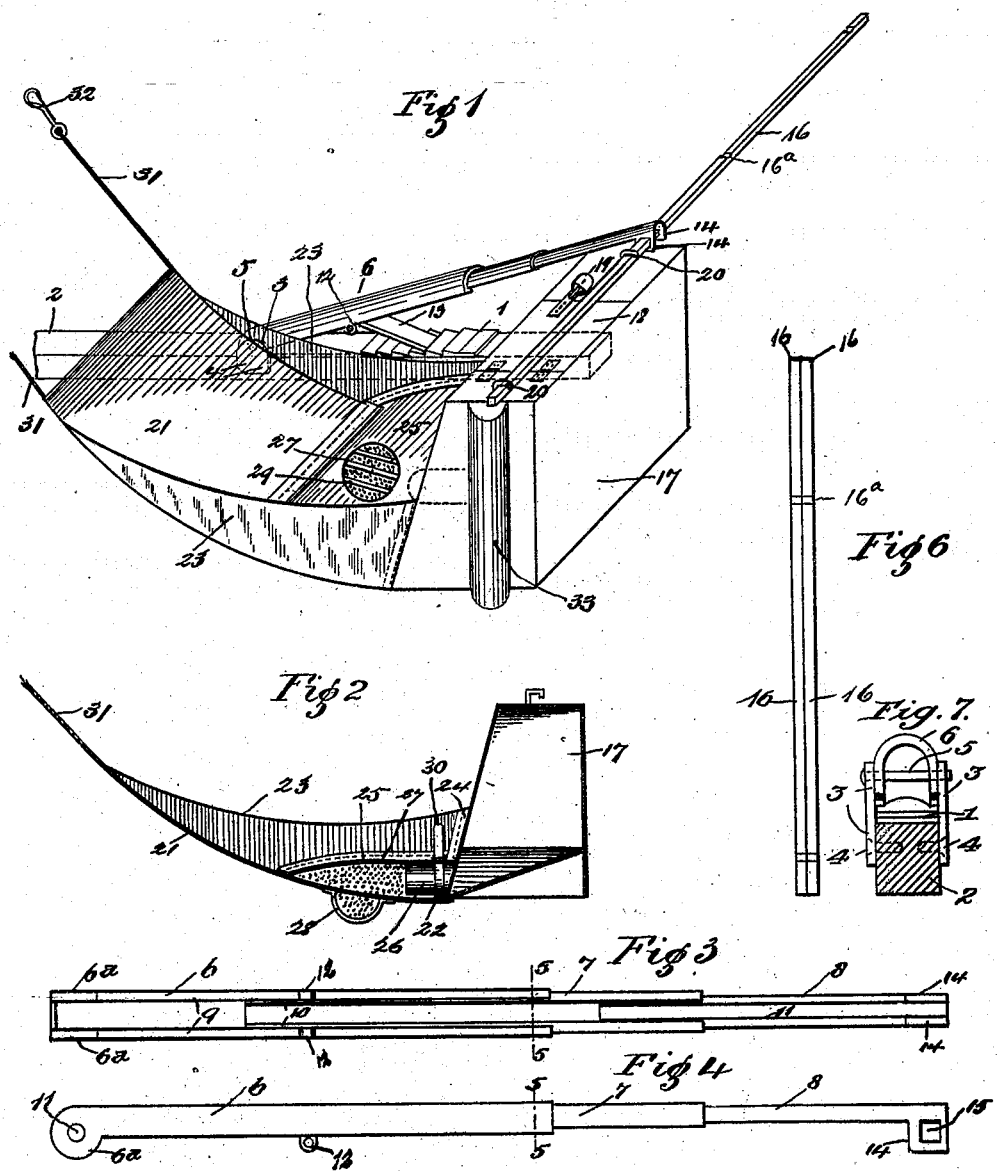
WITNESSES:
INVENTOR
Van Wyck A. Croshier
BY
Thompson R Bell
ATTORNEY

UNITED STATES PATENT OFFICE.

VAN WYCK A. CROSHIER, OF CHICAGO, ILLINOIS.

STREET FEEDING DEVICE FOR HORSES.

No. 924,435.  Specification of Letters Patent.  Patented June 8, 1909.

Application filed January 29, 1908. Serial No. 413,244.

*To all whom it may concern:*

Be it known that I, VAN WYCK A. CROSHIER, citizen of the United States, residing at Chicago, in the county of Cook and State of Illinois, have invented certain new and useful Improvements in Street Feeding Devices for Horses, of which the following is a specification, reference being had therein to the accompanying drawing.

This invention relates to an improvement in portable mangers for feeding horses when in harness as will be hereinafter described in the specification and particularly pointed out in the claims.

The object of this invention is to provide an open topped portable feed manger for horses by means of which the horse shall have free use of his head while eating and shall be able to breathe pure air freely; to provide means for elevating or lowering and adjusting the said manger in position to suit the horse eating therefrom; to provide means for regulating the flow and the supply of the grain from the grain container to the manger, and to provide means for preventing the horse from wasting the grain supplied to said manger. I attain these objects by means of the device illustrated in the accompanying drawings in which like numerals of reference designate like parts throughout the several views.

Figure 1 is a perspective view of the device showing the means whereby the manger is adjusted and secured to the end of a tongue of a wagon; Fig. 2 is a side vertical sectional view of the grain container and the manager attached thereto; Fig. 3 is an enlarged detail inverted view of the extensible supporting arms; Fig. 4 is a side view of the same; Fig. 5 is a sectional view of the same taken along the line 5—5 in Figs. 3 and 4; Fig. 6 is a detail view of the grain container supporting bar showing the latter folded, and Fig 7 is a transverse sectional view of the tongue showing the rack and the tongue secured to the lugs thereof, whereby the rack is maintained in position on said tongue.

This device is capable of being connected to the front end of the tongue or shaft of a wagon, and in Fig. 1 I show said device applied to the front end of a tongue of a wagon.

The rack 1 is situated on the top flat side of the tongue 2 of a wagon, and is provided with the lugs 3 which lap over the sides of said tongue 2 and said lugs are provided with the screw holes 4 through which securing screws are passed to secure said lugs 3 to said tongue. The lugs 3 project above the top surface of the rack 1 and in the top ends thereof are formed bores through which the hinge pin 5 of the extensible arm is passed.

The extensible arm is composed of the main portion 6, the intermediate telescoping portion 7, and the outer end telescoping portion 8. These portions of said extensible arm are each constructed in the form of an inverted U and said portions are provided with the inwardly extending retaining flanges or lips 9 and 10. The retaining lips 9 formed on the inner bottom edges of the main portion 6 of the extensible arm retain the intermediate portion 7 in position relatively to said main portion to freely slide or telescope into the hollow under side thereof, and similarly the retaining strips or lips 10 of the intermediate portion 7 of the extensible arm are provided for the purpose of retaining the outer end telescoping portion 8 in relative position to said intermediate portion 7 to slide or telescope therein.

On the end of the main portion 6 of the extensible arm are formed the hinge lugs 6$^a$ which are provided with the bores 11 which are adapted to receive the pin 5 whereby the said extensible arm is hingedly connected to said lugs 3. Intermediate the ends of the main portion 6 and on the bottom edge thereof are formed the lugs 12 to which the propping pawl 13 is hingedly connected at its top end, and said pawl is adapted to engage the teeth of said rack 1, so that the angle of said extensible arm may be adjusted to elevate or lower the free end of said arm. The outer end telescoping portion 8 of said extensible arm is provided with the depending lugs 14 in which are provided the square holes 15 through which the cross-bar 16 is passed to be sustained in horizontal position.

The grain container may be constructed of metal or canvas but I prefer to construct said container of metal, as sheet galvanized iron or other suitable material, in which case 17 designates the grain container having the top hinged lid 18 which is locked closed by a suitable pad-lock 19. On the top side of said grain container are provided the supporting hooks 20 by which said grain container is suspended and said hooks are adapted to be slipped on the bar 16 and into the notches 16$^a$ formed on the top edge of said cross bar, so that the container be removably secured to and held in position on said bar.

The bottom apron portion 21 of the manger extends from the strip 22 situated at the rear bottom edge portion of said grain container, and the side portions 23 of said apron project from the rear side strips 24 of the container to which they are connected. The cover apron 25 is situated to extend from the rear side of said grain container over the grain spout 26 thereof to form a grain bag or pocket with the lower apron 21 and thereby inclose the grain confined between the said apron 21 and its cover 25 and prevent it being spilled therefrom. A feed opening 27 is formed in the upper apron cover 25 which opening is situated directly over the dish receptacle 28 in which the grain is deposited, and said opening is provided with the bars or strips 29 which are of a flexible material as rubber, canvas, or cords, and said bars are provided for the purpose of preventing the horse eating in said manger from dipping his nose too far into the grain to waste the latter. Situated directly under the feed opening 27 is a dish 28 or other receptacle which is secured to the bottom apron 21 and situated relatively to the spout 26 that the grain flowing therefrom will be deposited in said dish or receptacle.

The spout 26 is preferably constructed of a flexible material, as rubber or canvas, and said spout is provided with a strap 30 whereby the flow of the grain therethrough may be regulated or completely stopped as desired.

The rear end corners of the apron 21 are provided with the cords 31 to the end of each of which is connected a snap hook 32 which latter may be connected or hooked to the rein rings, water hooks or other suitable part of the harness.

The cross-bar 16 is preferably hinged at its center portion so as to be folded as shown in Fig. 6 to be placed in the pocket 33 situated at one side of the grain container 17.

I claim:—

1. In a portable manger for feeding horses, the combination with a grain container and a spout projecting from said grain container, of a lower apron situated at its front end under said spout and extending from the rear bottom side of said grain container, upwardly extending sides on said lower apron, and an upper cover apron extending over said spout and over a portion of the surface of said lower apron and connected to the upright sides thereof to form a grain pocket, said cover apron having a feed opening formed therein.

2. In a portable manger for feeding horses, the combination with a grain container and a spout projecting from the rear side of said container, of a lower apron extending from the rear bottom side of said grain container, and having its front central portion situated under said spout, upwardly extending sides on said lower apron, a grain receptacle situated centrally and near the forward end of said apron and under the spout of said container, and a cover apron extending over said receptacle and having a feed opening situated over said receptacle, and a screen situated in said opening.

3. In a portable manger for feeding horses, the combination with a grain container and a spout projecting rearwardly therefrom and means for regulating the flow of the grain from said spout, of a lower manger apron situated at its front end under said spout and extending backwardly from the rear bottom side of said grain container, upwardly extending sides on said lower apron, a grain receptacle secured to said lower apron and having its forward central portion situated under said spout, a cover apron extending over said spout and over the surface of said grain receptacle, said cover apron provided with a feed opening, and a screen in said feed opening.

4. In a portable manger for feeding horses, the combination with a grain container and a manger connected thereto, of a rack, lugs on said rack, an arm pivoted to said lugs, a pawl hingedly connected to said arm and coöperating with said rack to support said arm in adjusted position, a cross-bar situated at the free end of said arm and extending horizontally and at right angles therewith, and means for removably securing said grain container to said bar.

5. In a portable manger for feeding horses, the combination with a grain container, and an open manger connected thereto, of a rack, lugs on said rack, an extensible arm pivoted at its rear end between said lugs, a pawl hingedly connected to said arm and coöperating with said rack to support said extensible arm in adjusted position, a horizontally extending cross-bar situated at and removably secured to the free end of said extensible arm, means for removably securing said grain container to said cross bar, and means for securing the manger apron to the head of the horse.

In testimony whereof I affix my signature in presence of two witnesses.

VAN WYCK A. CROSHIER.

Witnesses:
THOMPSON R. BELL,
FRANCIS M. SPRINGER.